(12) United States Patent
Lehtimäki

(10) Patent No.: US 7,379,877 B2
(45) Date of Patent: May 27, 2008

(54) SIGNAL PROCESSING DEVICE AND SIGNAL PROCESSING METHOD

(75) Inventor: Matti Lehtimäki, Espoo (FI)

(73) Assignee: Nokia Corporation, Espoo (FI)

(*) Notice: Subject to any disclaimer, the term of this patent is extended or adjusted under 35 U.S.C. 154(b) by 332 days.

(21) Appl. No.: 10/489,420

(22) PCT Filed: Sep. 13, 2001

(86) PCT No.: PCT/EP01/10607

§ 371 (c)(1),
(2), (4) Date: Apr. 16, 2004

(87) PCT Pub. No.: WO03/024137

PCT Pub. Date: Mar. 20, 2003

(65) Prior Publication Data

US 2004/0254796 A1    Dec. 16, 2004

(51) Int. Cl.
*H04J 3/16* (2006.01)

(52) U.S. Cl. .................. 704/500; 370/468; 375/219; 375/220

(58) Field of Classification Search ............... 375/130, 375/219, 220, 222, 377; 455/522, 73, 78; 370/468, 278, 282, 276
See application file for complete search history.

(56) References Cited

U.S. PATENT DOCUMENTS

| | | | | |
|---|---|---|---|---|
| 5,949,484 A | * | 9/1999 | Nakaya et al. | 348/384.1 |
| 6,577,875 B1 | * | 6/2003 | Brouwer | 455/522 |
| 7,002,992 B1 | * | 2/2006 | Shaffer et al. | 370/468 |

FOREIGN PATENT DOCUMENTS

| | | |
|---|---|---|
| EP | 0 658 841 A2 | 6/1995 |
| EP | 1 014 738 A2 | 6/2000 |
| EP | 1 124 386 A1 | 8/2001 |

\* cited by examiner

*Primary Examiner*—David C. Payne
*Assistant Examiner*—Leon Flores
(74) *Attorney, Agent, or Firm*—Squire, Sanders & Dempsey, L.L.P.

(57) ABSTRACT

Signal processing device and method include at least two codec units configured to operate in a plurality of modes of a coding/decoding/tandem free operation for data transmitted on a respective allocated channel. A control unit is configured to control the at least two codec units. The control unit includes a detection unit, a judging unit, and a commanding unit. The detection unit is configured to detect a request for activating a codec unit. The judging unit is configured to judge whether a resulting required signal processing power for all activated codec units exceeds a predetermined threshold level of an overall signal processing power. The commanding unit is configured to command, if the judging unit takes a positive judgment, at least one of the activated codec units to operate in such a mode that the resulting signal processing power for all activated codec units does not exceed the predetermined threshold level.

13 Claims, 4 Drawing Sheets

SIGNAL PROCESSING DEVICE AND SIGNAL PROCESSING METHOD

FIELD OF THE INVENTION

The present invention relates to a signal processing device and signal processing method. In particular, the present invention relates to such a device and method used for example in communication networks.

BACKGROUND OF THE INVENTION

With the recent developments in communication networks, an increasing demand for reducing costs of communication has arisen. One approach for reducing costs has lead to the development of the so called Voice over IP feature (VoIP) (also known as IP telephony) which is currently becoming more and more popular. In brief, VoIP means that data which were transmitted before via the communication network are modified for being transmitted via an intermediate Internet Protocol (IP) based network. Thus, the transmitting path of the data within the non-IP based communication networks which is deemed to be the most expensive one is shortened as much as possible to reduce costs.

The current main benefits of the IP telephony concept are: Transmission savings which are achieved in two forms:

firstly, leased time divisional multiplexing (TDM) lines in the non-IP communication networks may (at least partly) be replaced with much cheaper IP connections, and secondly, the amount of traffic in the IP network may further be cut down with compression techniques.

In addition, a speech quality enhancement is achieved by implementing so called Tandem Free Operation (TFO) capabilities in used gateways.

Figure 1:
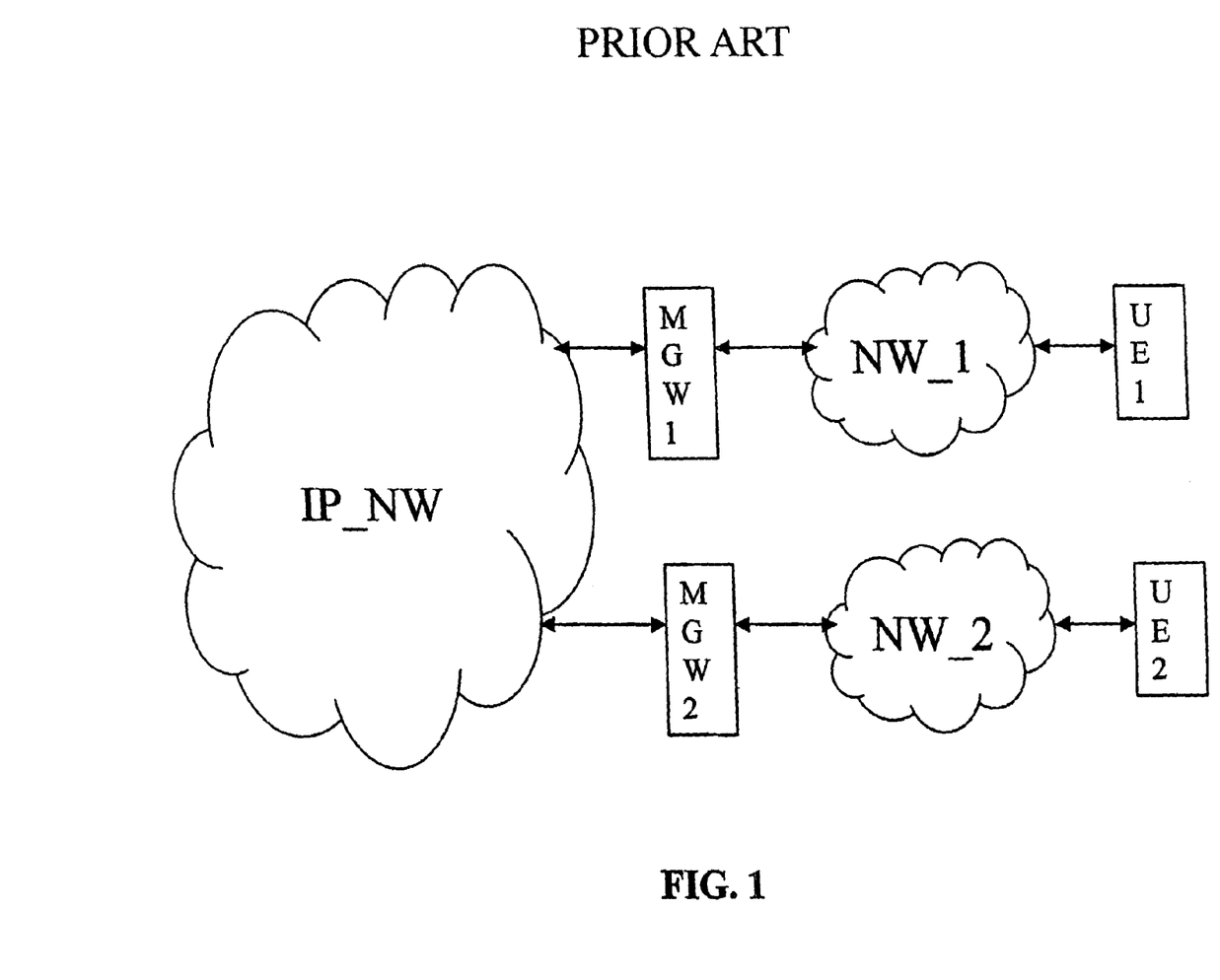
FIG. 1 shows in rough outline on a network plane two terminals communicating with each other via at least an intermediate IP based network.

The general network concept will be briefly explained with reference to FIG. 1. In this connection it is to be noted that the subsequent explanations will be given mainly with reference to a GSM communication network, while the invention is not limited thereto. Rather, also a UMTS (Universal Mobile Telecommunication System) network currently developed by the $3^{rd}$ generation partnership project 3GPP or any other mobile or non-mobile communication network may be used instead. A terminal denoted by UE1 (user equipment and/or mobile station) communicates via a network NW_1 (not based on IP). In the network there are provided (not shown and in the order of a data flow originating from the terminal) an access network part consisting of e.g. at least one base station BS communicating with the terminal, the base station being controlled by a base station controller BSC, which in turn is controlled by a switching network part comprising e.g. at least one exchange such as a mobile services switching center MSC. According to GSM, after the BS or after the BSC there is provided a transcoding rate adaptation unit referred to as TRAU unit, performing a transcoding and rate adaptation of the data for further transmission. According to existing standards, the TRAU unit outputs a 64 kBit/s PCM (Pulse Code Modulated) signal to the MSC for further transmission.

The network NW_1 in turn is provided with and/or connected to a gateway MGW_1 (Media Gateway). Such a gateway may be represented by a Gateway MSC, i.e. a GMSC or by a separate gateway GW connected to a MSC.

Generally, a gateway provides an interface and/or interworking functionality such that the networks connected to the gateway may cooperated with each other. Stated in other words, gateway MGW_1 provides an interworking function for NW_1 (e.g. GSM) and IP_NW (e.g. the Internet). Thus, the PCM data arriving at the gateway are required to be converted and/or modified to IP compatible data (IP packets), since the IP based network IP_NW relies on a principle of transmitting data in units of packets.

The IP packet data are then transmitted via the IP based network IP_NW, a further gateway MGW_2, a further network NW_2 to a destination, i.e. terminal UE_2. The data transmission principle from the IP_NW up to the terminal UE_2 is similar to the transmission outlined above with the exception that it is performed in reverse order.

Figure 2:
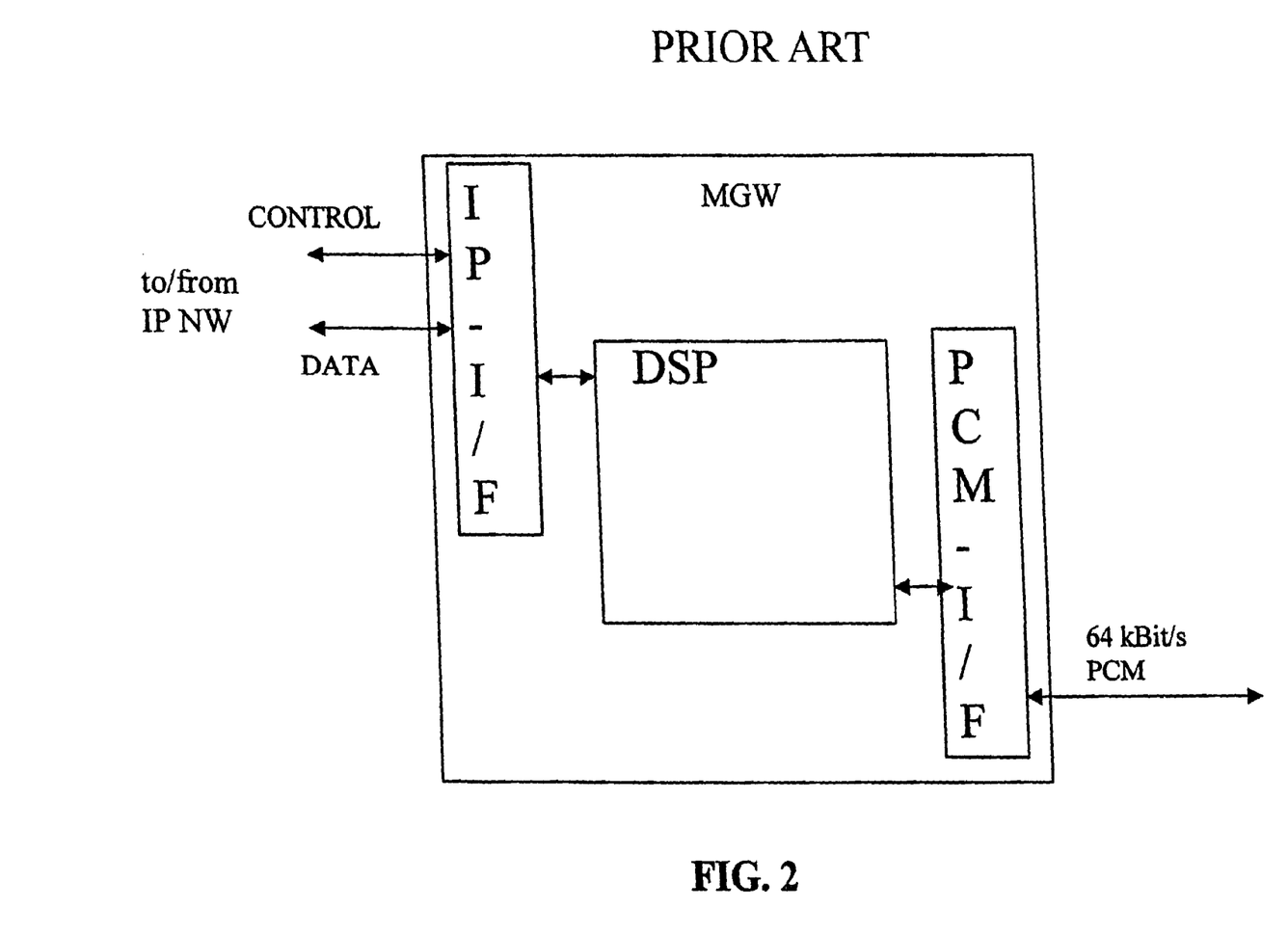
FIG. 2 shows a simplified block diagram of a gateway used for connecting different communication networks.

It is to be noted that the networks NW_1 and NW_2 may be different networks or the same network. Also, if different, they may rely on the same standard such as GSM or rely on different standards. Also, if they are the same network, the gateways may in most cases be located separately from each other, while it is not excluded that under certain circumstances the gateways MGW_1 and MGW_2 could be a single identical gateway FIG. 2 shows in rough outline and in a strongly simplified manner some components of a gateway MGW (MGW_1 or MGW_2). It should be noted that the illustrated components are by far not the only components/functionalities of a gateway. Rather, only those components which will become necessary for understanding the present invention are shown in outline. It is also to be noted that the shown components may be provided as a separate module to be used as a plug-in unit in combination with remaining gateway components (not shown). Thus, with reference to FIG. 2, a 64 kBit/s PCM data stream arriving at the gateway from the network NW_1 or NW_2 (e.g. based on GSM standard) is processed by a signal processing device DSP (such as a digital signal processor, arranged between an PCM interface PCM-I/F and a IP interface IP-I/F. Likewise, data are processed by said signal processing device DSP prior to being output from said gateway (via an interface PCM-I/F) to said network NW_1 or NW_2.

The DSP performs various tasks such as echo cancellation, DTMF tone detection, jitter buffering, TFO (tandem free operation) control, and speech coding/decoding, as well as controlling the DSP (functional units thereof) as such. Each task may be represented by a specific means/unit in the DSP and/or by a specific processing carried out by the DSP, mostly in parallel.

For example, jitter buffering is provided in order that the variable IP network delay be compensated by buffering a number of the IP frames.

For all tasks to be performed by the DSP, the DSP has to rely on an overall processing power. Of the above mentioned task, the coding/decoding operation consumes the most part of the available processing power. Thus, for each channel, i.e. communication connection between communication partners such as the terminals UE_1 and UE_2, a codec means (coding/decoding means) has to be provided for and/or implemented in order to perform coding/decoding of the data transmitted between the communication partners.

Consequently, considering the limited overall processing power of the DSP, there results a limitation in the channel capacity of the DSP. Stated in other words, the number of channels that can be handled by the digital signal processor is limited. The number of channels that can be handled, i.e. the number of codecs implemented in the signal processor is set such that even under conditions of a worst case scenario for each channel the processing capacity of the signal processor is sufficient to successfully handle the coding/decoding for every channel.

Each codec of a respective channel is adapted to handle different channel types and may be controlled to change its operating mode according to the channel type. Examples for such channel types are the adaptive multi rate AMR, enhanced full rate EFR, full rate FR, half rate HR, and G.711, Wideband AMR, AMR TFO, EFR TFO, FR TFO, HR TFO Wideband AMR TFO, etc. Each channel type differs in the transmission capacity and hence in the processing capacity required for performing a codec operation for such a channel. The processing capacity is highest for Wideband AMR/AMR and decreases for EFR, FR, HR in this order down to the lowest required processing capacity for G.711.

In order to handle numerous channels, a previous approach resided in providing several DSPs and to distribute the channels to be handled by them by means of a controlled switch serving the DSPs provided for. This required extra hardware for control purposes of such a centralized resource management. However, even in such a case, the channel capacity remained limited and a further addition of DSPs was rather disadvantageous in terms of correspondingly increasing costs.

SUMMARY OF THE INVENTION

Hence, it is an object of the present invention to provide a signal processing device and method which is respectively free from the above mentioned drawbacks.

According to the present invention, this object is for example achieved by a signal processing device, comprising at least two codec means adapted to operate in a plurality of modes of a coding/decoding/TFO operation for data transmitted on a respective allocated channel, and a control means adapted to control said at least two codec means, wherein each mode of a coding/decoding/TFO operation for data transmitted on a respective allocated channel consumes a respective predetermined amount of an overall processing power of said signal processing device, said overall signal processing power provided for at least amounts to an integer multiple k of a predetermined first amount of processing power consumed by a first of said plurality of modes of coding/decoding/TFO operation, and wherein a number N of said at least two codec means is greater than said integer multiple k, said control means comprising: detection means adapted to detect a request for activating a codec means to operate in a specific mode, judging means adapted to judge whether a resulting required signal processing power for all activated codec means would exceed a predetermined threshold level of the overall signal processing power, and commanding means adapted to command, if said judging means takes a positive judgment, at least one of said activated codec means to operate in such a mode of said plurality of modes that the resulting signal processing power for all activated codec means does not exceed said predetermined threshold level of the overall signal processing power.

Also, according to the present invention this object is achieved by a signal processing method, comprising the steps of providing at least two codec means adapted to operate in a plurality of modes of a coding/decoding/TFO operation for data transmitted on a respective allocated channel, and controlling said at least two codec means, wherein each mode of a coding/decoding/TFO operation for data transmitted on a respective allocated channel consumes a respective predetermined amount of an overall processing power of said signal processing device, said overall signal processing power provided for at least amounts to an integer multiple k of a predetermined first amount of processing power consumed by a first of said plurality of modes of coding/decoding/TFO operation, and wherein a number N of said at least two codec means is greater than said integer multiple, wherein said controlling comprises the further steps of detecting a request for activating a codec means to operate in a specific mode, judging whether a resulting required signal processing power for all activated codec means would exceed a predetermined threshold level of the overall signal processing power, and commanding, if said judging yields a positive judgment, at least one of said activated codec means to operate in such a mode of said plurality of modes that the resulting signal processing power for all activated codec means does not exceed said predetermined threshold level of the overall signal processing power.

According to favorable further developments of said device/method:
- said predetermined first amount of processing power consumed by said first of said plurality of modes of coding/decoding/TFO operation is a maximum amount that can be consumed by a coding/decoding/TFO operation,
- said command means/step commands said codec which is requested to be activated,
- said command means/step commands a codec which operates in a mode consuming said predetermined first amount of processing power,
- said mode commanded by said commanding means/step to be operative in said activated codec means is a predetermined mode,
- said predetermined mode is a mode consuming a minimum amount of processing power.

By virtue of the present invention, at least the following advantages can be obtained:
1. every signal processing device handling user data (also referred to as user plane processor) such as speech is enabled to autonomously handle its signal processing capacity,
2. no centralized resource management is needed for this purpose,
3. every signal processing device can therefore be connected permanently to a certain fixed number of channels (the number of channels exceeding the number of worst case channels that can be handled by the processing device),
4. no switching of channels between different signal processing devices is required any longer,
5. resources of the network can be efficiently used with the present invention being applied, while it is easy to be implemented,
6. for example a network node such as a gateway using the present invention may be provided at reduced costs, since
a) either the same traffic amount (corresponding to a number of channels) can be handled with less signal processing devices (DSPs), or
b) when maintaining the number of signal processing devices unchanged, more channels can be handled and thus an increased traffic capacity can be provided for at the network node,
7. all available processing power can effectively be used.

BRIEF DESCRIPTION OF THE DRAWINGS

The present invention will subsequently be described in greater detail with reference to the accompanying drawings, in which.

DETAILED DESCRIPTION OF THE EMBODIMENTS

The present invention is now described in detail with reference to the drawings.

Generally, voice is compressed to save network capacity. Typical compression ratios for speech are 8:1 and 4:1. Additional compression (approximately 2:1) is gained using a Voice Activity Detection (VAD) function and discontinuous transmission (DTX), i.e. only voice is transmitted—not silence. The VAD and DTX functions are integrated into the voice codec in addition to a Bad Frame Handling (BFH) mechanism. It should be noted that each additional encoding/decoding pair in the transmission link (channel) degrades the speech quality.

A mechanism named tandem free operation, TFO, is also available. The purpose of the Tandem Free Operation (TFO) is to avoid multiple encodings/decodings, to thereby achieve better speech quality by avoiding multiple encodings/decodings of the speech signal. In the ideal case the speech is encoded and decoded only in the (e.g. mobile) terminals. The encoded speech parameters are transferred in the least significant bits of the 64 kBit/s PCM samples. If the TFO negotiation (which happens by bit-stealing a 0.5 kBit/s channel from the PCM stream) is not successful, the TFO frames are not transferred at all and the PCM stream stays as it is. In the GSM network the TFO connection is formed between a pair of transcoders (TRAUs) but here also a VoIP gateway and/or a so-called media gateway may act as a TFO end-point.

Recent signal processor designs were based on safety considerations such that even in a worst case the operation could be successfully continued.

That is, assuming that a codec may operate in a plurality of different modes, one mode may be a first mode which requires a predetermined first amount of processing power. Also, said predetermined first amount of processing power consumed by said first of said plurality of modes of coding/decoding/TFO operation is assumed to be a maximum amount that can be consumed by a coding/decoding/TFO operation. For example, codec modes (channel types) may be AMR, EFR, FR, HR, G.711 and different TFO's as mentioned above. Also, the AMR mode requires the highest (maximum) amount of processing capacity. Then, assuming that the signal processing device should be able to successfully handle four channels even if all four channels/codecs are operated in AMR mode, the processing device requires an overall processing capacity of at least four times said maximum amount plus a spare processing capacity for performing other tasks different from encoding/decoding (such as e.g. control procedures).

Stated in other words, said overall signal processing power provided for at least amounts to an integer multiple k of a predetermined first amount of processing power consumed by a first of said plurality of modes of coding/decoding/TFO operation, in the above example k=4. Also, assuming that a spare processing capacity would amount to e.g. 20% of an overall processing capacity, a predetermined threshold level of the overall signal processing power of 80% in this example would be available for codec operations. The remaining 20% "spare" capacity are used for internal control of the signal processing device and/or other tasks.

As mentioned herein before, the main limitation in the channel capacity in a signal processing device is the speech codec (encoding&decoding) that takes more than half of the processing power with most of the codecs. In an IP gateway it takes for example, roughly 75-90% of an overall processing capacity in the worst case. However as the unit is mainly designed to operate in TFO mode, encoding and decoding are not needed in the gateway, when TFO is active and it should be active typically in about 50% of the calls even without additional signaling. In addition, there may be codecs used that take less processing power such as FR speech codec that is quite common still. Previously, the capacity allocation has been done according to the worst case, so that available processing power could not fully be used unless the worst case occurred.

The present invention goes a different way for capacity allocation, i.e. the channel capacity of the signal processing device is set much bigger than the worst case would dictate. Stated in other words, a signal processing device according to the present invention is designed such that it would be incapable of handling an occurring worst case situation.

This will be Explained in Detail as Follows:

Initial assumption I:

It was initially assumed that for 4 channels (k=4) a codec operation could be successful under worst case conditions.

Assumption I.1:

If, however, the channels handled by the signal processing device of the gateway can safely be assumed to be in a TFO mode (with 50% certainty, i.e. half of the channels are in TFO), then the channel capacity can be doubled. Hence a signal processing device can be designed to handle 8 channels (4 channels are in TFO and do not need a coding/decoding operation, while the other four channels in non-TFO could be handled (i.e. coded/decoded) even under worst case conditions).

Assumption I.2:

Still further, if it can safely be assumed that the channels handled by the signal processing device of the gateway are with 75% certainty in a TFO mode, the signal processing device can be designed to handle 16 channels (12 channels (75% of 16) are in TFO and do not need a codec, while the other four channels in non-TFO mode could be handled even under worst case conditions).

Furthermore, if a situation occurs in which (as a modified initial assumption), a signal processing device could handle k=8 channels (codecs) under worst case conditions, in correspondingly modified cases I.1 and I.2. above, the channel number could be increased to 16 channels or 32 channels, respectively.

Thus, a number N of said (at least two) codec means provided for in said signal processing device is greater than said integer multiple k, defining a number of codecs that can be handled under worst case conditions.

Figure 3:
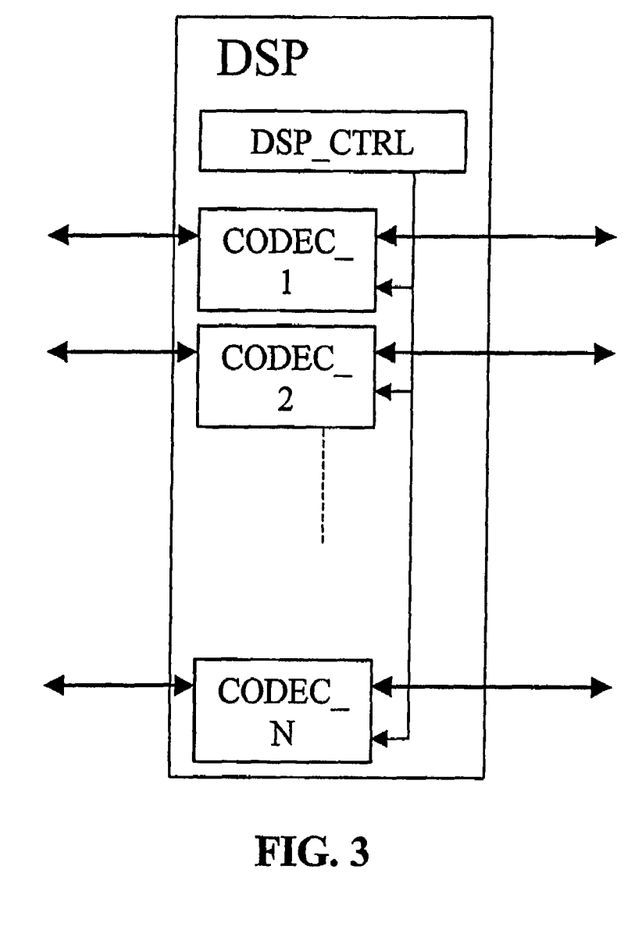
FIG. 3 shows a simplified block diagram of a signal processing device according to the present invention enabled to autonomously control its capacity.

FIG. 3 shows as a schematic block diagram a signal processing device such as a DSP according to the present invention. As shown, the DSP comprises codecs 1, 2, . . . , N (which means that the DSP provides processing capacity to activate/carry out 1 to N codec operations), which codecs operate in a plurality of modes of a coding/decoding/TFO operation for data transmitted on a respective allocated channel (N channels), and a control means DSP_CTRL adapted to control said at least two codec means. If a respective codec would have to be operated under worst case conditions (in terms of maximum required processing capacity), the threshold (e.g. 80%) of the overall DSP processing capacity would be reached already with k codecs, k being smaller than N.

The control means DSP_CTRL in said signal processing device is adapted to control said at least two codec means autonomously. That is, the control means controls whether a codec is to be activated for a channel as well as in which mode a codec is operated. A codec is activated upon request, which request (not shown) is supplied externally to said control means DSP_CTRL.

Figure 4:
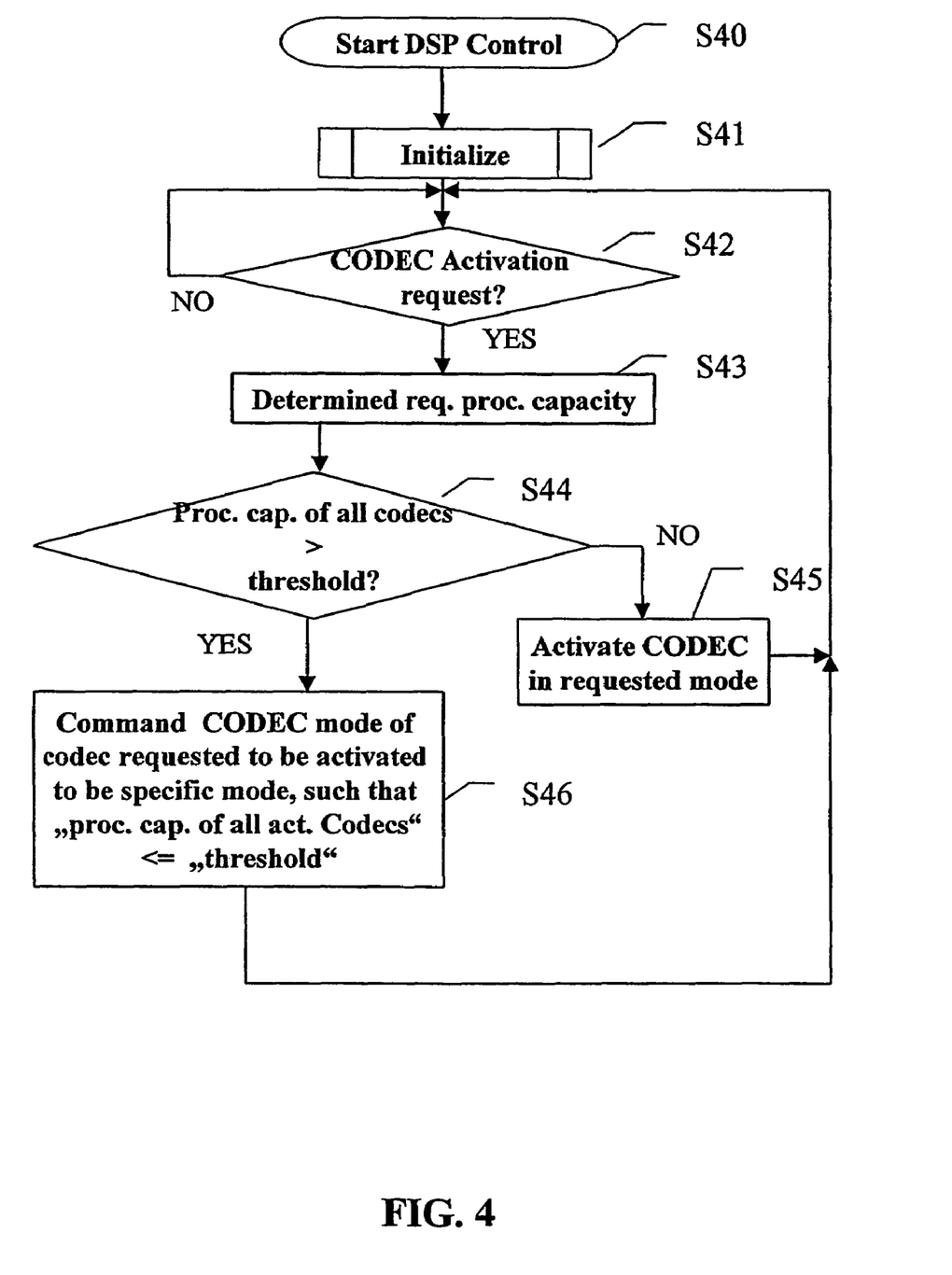
FIG. 4 shows a flowchart of a signal processing device control procedure implemented in/carried out by the control means shown in FIG. 3.

Details of the control procedure for dynamic resource handling at the DSP side are explained below with reference to FIG. 4.

The control procedure starts in Step S40. Thereafter, in step S41, an initialization process is performed. In connection with such an initialization, the control means acquires a knowledge of the overall signal processing capacity of the signal processing device DSP, a threshold of the signal processing capacity, e.g. defining the partitioning between processing capacity for codecs and other tasks to be performed by the DSP. For example, as mentioned earlier, 80% of the overall processing capacity can be reserved for codec operations. Also, a knowledge of codec modes to be used is acquired.

In step S42, the control means, more precisely, a detection means thereof, monitors the channels to detect a request for activating a codec means to operate in a specific mode. This means that a new channel could be requested to be activated for codec processing, or that an already active channel changes his operation mode and therefore the required processing capacity changes. For example, in case a channel operated in TFO mode is no longer operated in TFO, a codec operation is required for this channel. In order to avoid misunderstandings, it is to be noted that although TFO is described as a codec operation mode, the TFO mode does not require a codec operation "as such". Rather, data transmitted via a codec means in TFO mode are merely "passed through" the codec means which could thus be regarded as being idling (and therefore not requiring codec processing capacity). If TFO mode is given up, the corresponding codec changes his mode in that a codec operation "as such" has to be performed by performing an actual coding/decoding, i.e. the codec means is no longer idling. A channel may stop TFO operation, if e.g. the terminal changes the serving base station, changes the TRAU unit (i.e. a base station controller BSC or mobile switching center MSC), an interruption occurs within the IP network, or the like.

If no such request is received/detected in step S42, the process continues monitoring and loops back to step S42. If such a request is detected, the flow advances to step S43. In step S43, the required processing capacity is determined for the codec to be activated. This required processing capacity is dependent on the channel type (e.g. AMR, EFR, FR, HR, G.711) as the codec is adapted to operate, dependent on the channel type, in a plurality of modes of a coding/decoding/TFO operation for data transmitted on a respective allocated channel.

Stated in other words, in step S43, a summing of all individual processing capacities of the active codecs and/or the codec to be activated is determined by calculation.

In a subsequent step S44, the calculated sum is compared with the threshold of the overall DSP signal processing capacity. The threshold can be variable dependent on how many other tasks are to be performed and/or on how "difficult" these other tasks are, i.e. how much processing load is involved. Stated in other words, the control means comprises judging means adapted to judge whether a resulting required signal processing power for all activated codec means would exceed a predetermined threshold level of the overall signal processing power or not.

If, in step S44, the comparison yields that the calculated sum does not exceed the threshold processing capacity (NO in step S44), the flow proceeds to step S45. In step S45, the codec requested to be activated is activated in the requested mode. If, in step S44, the comparison yields that the calculated sum does exceed the threshold processing capacity (YES in step S44), the flow proceeds to step S46.

In step S46, a command means of the control means commands the codec mode of (e.g.) the codec which is requested to be activated, to be a specific mode, such that the processing capacities of all active codecs does not exceed the threshold.

Expressed as a formula, this means:

$$\sum_{i=1}^{N} \text{proc\_cap\_}(i) <= \text{threshold}$$

where i denotes an index for identifying the codecs, i.e. i is running from i=1 . . . N, proc_cap_(i) denotes the required processing capacity for codec i, and threshold denotes the portion of the overall processing capacity of the signal processing device available/reserved for codec operations. (As mentioned before, proc_cap(i) of codec i operated in TFO is zero.)

Thereafter, the flow returns to step S42.

At least the codec mode of the codec which is requested to be activated is commanded to be a specific one. For example, it is beneficial that this mode is the mode requiring the least/lowest processing power such as the mode G.711. Also, if the codec mode of the codec which is requested to be activated being said specific mode of the least processing power is not sufficient to fulfil the above relation, (one or more) additional codecs could be commanded to a codec mode requiring a less or even the least amount of processing power.

Still further, additionally or alternatively, a codec mode of a codec consuming a maximum amount of processing power could be commanded to a specific mode such as the least processing power consuming mode.

Thus, as has been described herein above, when stated in other words, the channel capacity of the bsP is set much bigger than the worst case would dictate. Most of the time the capacity situation is non-problematic as a lot of channels are in TFO or are using a codec that takes less processing power than the worst case. When an additional codec operation is needed (because of TFO operation has stopped or for some other reason (there are several)) and it can be foreseen that the encoding would overload the processor (or in practical implementation go over a specified upper limit and/or threshold), then this is solved by using for example G.711 coding that is very light in processing (G.711 is below 0.5 MIPS (Million Instructions Per Second), EFR is around 10-15 MIPS). This G.711 codec does not compress from 64 kbit/s, but as there are a lot of channels in the system, this kind of small transmission capacity increase is not a problem (and can even be taken into account when designing the network). And in overall the compression advantage is still there since other channels are still operated in modes performing a compression. The benefit from this kind of system is huge as can be seen from the above given example in connection with the "assumptions". Typically, these N channels of a signal processing device according to the present invention will be most of the time in TFO mode and a situation where more than e.g. 4 channels would need decoding/encoding is quite rare. When the probability of TFO is even higher, the benefit to be obtained with the present invention will correspondingly increase. Also in cases where the other end is PSTN (public switched telephone network), then the other end can be practically 100% in TFO (in the other end the processors must be according to the worst case capacities as there the probability of TFO will be quite small (TFO coming from PSTN (actually as TFO will get more and more popular and PSTN phones get more and more rare then this should increase significantly and at then should be close to 100% providing that all operators upgrade TFO to their transcoders.))

The invention proposes not only the dynamic structure itself, but in particular that every user plane processor (DSP) can do this dynamic capacity handling itself and no centralized resource management is needed. Every DSP can therefore be connected permanently to a certain fixed number of channels (which is not the worst case) and no switching is needed either.

Accordingly, as has been set out in detail before, the present invention relates to a signal processing device, comprising at least two codec means adapted to operate in a plurality of modes of a coding/decoding/TFO operation for data transmitted on a respective allocated channel, and a control means adapted to control said at least two codec means, wherein each mode of a coding/decoding/TFO operation for data transmitted on a respective allocated channel consumes a respective predetermined amount of an overall processing power of said signal processing device, said overall signal processing power provided for at least amounts to an integer multiple k of a predetermined first amount of processing power consumed by a first of said plurality of modes of coding/decoding/TFO operation, and wherein a number N of said at least two codec means is greater than said integer multiple k, said control means comprises: detection means adapted to detect a request for activating a codec means to operate in a specific mode, judging means adapted to judge whether a resulting required signal processing power for all activated codec means would exceed a predetermined threshold level of the overall signal processing power, and commanding means adapted to command, if said judging means takes a positive judgment, at least one of said activated codec means to operate in such a mode of said plurality of modes that the resulting signal processing power for all activated codec means does not exceed said predetermined threshold level of the overall signal processing power. The present invention also relates to a corresponding signal processing method.

Although the present invention has been described herein above with reference to its preferred embodiments, it should be understood that numerous modifications may be made thereto without departing from the spirit and scope of the invention. It is intended that all such modifications fall within the scope of the appended claims.

The invention claimed is:

1. An apparatus, comprising:
a first plurality of codec units configured to process data on channels of a signal processing device, each codec unit configured to operate in a first plurality of modes of operation, wherein each mode of operation consumes a respective amount of processing power of said signal processing device; and
a control unit configured to control said first plurality of codec units, wherein said control unit comprises
a detection unit configured to detect a request for activating a codec unit to operate in a first mode,
a judging unit configured to judge whether a resulting required processing power for all activated codec units exceeds a predetermined threshold level when the codec unit operates in the first mode, and
a commanding unit configured to command, when said judging unit takes a positive judgment, said activated codec unit to operate in a second plurality of modes so that the resulting processing power used by all activated codec units does not exceed said predetermined threshold level.

2. The apparatus according to claim 1, wherein
said respective amount of processing power consumed by each of said first plurality of modes of coding/decoding/tandem free operation is a maximum amount that is consumed by a coding/decoding/tandem free operation.

3. The apparatus according to claim 1, wherein said commanding unit commands said codec which is requested to be activated.

4. The apparatus according to claim 1, wherein
said commanding unit commands a codec which operates in a mode consuming said predetermined first amount of processing power.

5. The apparatus according to claim 1, wherein
said mode commanded by said commanding unit to be operative in said activated codec unit is in a predetermined mode.

6. The apparatus according to claim 5, wherein said predetermined mode is a mode consuming a minimum amount of processing power.

7. A signal processing method, comprising:
providing a first plurality of codec units configured to process data on channels of a signal processing device, each codec unit configured to operate in a first plurality of modes of operation, wherein each mode of operation consumes a respective amount of processing power of said signal processing device, and
controlling said at least two codec units, wherein said controlling further comprises
detecting a request to activate a codec unit to operate in a first mode,
judging whether a resulting required processing power for all activated codec units exceeds a predetermined threshold level when the codec unit operates in the first mode, and
commanding, when said judging yields a positive judgment, said activated codec unit to operate in a second plurality of modes so that the resulting signal processing power used by all activated codec units does not exceed said predetermined threshold level.

8. The signal processing method according to claim 7, wherein
said respective amount of processing power consumed by each of said first plurality of modes of operation is a maximum amount that is consumed by a coding/decoding/tandem free operation.

9. The signal processing method according to claim 7, wherein commanding commands said codec which is requested to be activated.

10. The signal processing method according to claim 7, wherein
said commanding commands a codec which operates in a mode consuming said predetermined first amount of processing power.

11. The signal processing method according to claim 7, wherein
said mode commanded by said commanding to be operative in said activated codec means is a predetermined mode.

12. The signal processing method according to claim 11, wherein
said predetermined mode is a mode consuming a minimum amount of processing power.

13. An apparatus, comprising:
first plurality of codec means for processing data on channels of a signal processing device, each codec means for operating in a first plurality of modes of operation, wherein each mode of operation consumes a respective amount of processing power of said signal processing device; and
control means for controlling said first plurality of codec means, wherein said control means comprises
detection means for detecting a request for activating a codec means to operate in a first mode,
judging means for judging whether a resulting required processing power for all activated codec means exceeds a predetermined threshold level when the codec unit operates in the first mode, and
commanding means for commanding, when said judging means takes a positive judgment, said activated codec means to operate in a second plurality of modes so that the resulting signal processing power used by all activated codec means does not exceed said predetermined threshold level.

* * * * *